(12) United States Patent
Lee et al.

(10) Patent No.: US 8,040,826 B2
(45) Date of Patent: Oct. 18, 2011

(54) APPARATUS AND METHOD FOR SUPPORTING RELAY SERVICE IN A MULTI-HOP RELAY BROADBAND WIRELESS ACCESS COMMUNICATION SYSTEM

(75) Inventors: Mi-Hyun Lee, Seoul (KR); Jae-Weon Cho, Suwon-si (KR); Sung-Jin Lee, Seoul (KR); Hyun-Jeong Kang, Seoul (KR); Pan-Yuh Joo, Seoul (KR); Joon-Young Choi, Suwon-si (KR); Chang-Yoon Oh, Yongin-si (KR); Young-Bin Chang, Anyang-si (KR); Eun-Taek Lim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 591 days.

(21) Appl. No.: 11/714,085

(22) Filed: Mar. 5, 2007

(65) Prior Publication Data

US 2007/0217367 A1    Sep. 20, 2007

(30) Foreign Application Priority Data

Mar. 3, 2006  (KR) .................. 10-2006-0020247
Aug. 28, 2006 (KR) .................. 10-2006-0081828

(51) Int. Cl.
*H04B 3/36*         (2006.01)
(52) U.S. Cl. ............. 370/293; 370/492; 370/476; 455/7
(58) Field of Classification Search .................. 455/427, 455/431, 7–25; 370/316, 492, 279, 315, 370/501, 293, 502, 276
See application file for complete search history.

(56) References Cited

U.S. PATENT DOCUMENTS

| | | | | |
|---|---|---|---|---|
| 4,506,383 | A | * | 3/1985 | McGann .......................... 455/17 |
| 5,477,532 | A | * | 12/1995 | Hoshigami et al. ........... 370/277 |
| 5,841,766 | A | * | 11/1998 | Dent et al. ..................... 370/321 |
| 6,031,864 | A | * | 2/2000 | Bauchot et al. ................ 375/133 |
| 6,188,872 | B1 | * | 2/2001 | Nagira et al. ................. 455/11.1 |
| 6,330,446 | B1 | * | 12/2001 | Mori .......................... 455/435.2 |

(Continued)

FOREIGN PATENT DOCUMENTS

JP    1998-209957    8/1998

(Continued)

OTHER PUBLICATIONS

Oumer Teyeb, FACE Future Adaptive Communication Environment: Overview of Multihop Cellular Networks, FACE Project, Jun. 23, 2003.

(Continued)

*Primary Examiner* — Kent Chang
*Assistant Examiner* — Ronald Eisner
(74) *Attorney, Agent, or Firm* — The Farrell Law Firm, P.C.

(57) ABSTRACT

An apparatus and method for configuring a subframe to support a relay service in a multi-hop relay BWA communication system are provided, in which a first zone of a subframe is configured for at least one of communication between a BS and a first MS within the coverage area of the BS and communication between at least one RS and a second MS within the coverage area of the at least one RS, and a second zone of the subframe is configured for at least one of communication between the BS and the at least one RS and communication between the at least one RS and another RS.

20 Claims, 17 Drawing Sheets

U.S. PATENT DOCUMENTS

| | | | |
|---|---|---|---|
| 6,456,853 B1 | 9/2002 | Arnold | |
| 6,473,617 B1 | 10/2002 | Larsen et al. | |
| 6,577,646 B2 * | 6/2003 | Takeda et al. | 370/468 |
| 6,674,737 B1 * | 1/2004 | Baker | 370/338 |
| 6,891,810 B2 * | 5/2005 | Struhsaker et al. | 370/294 |
| 7,095,722 B1 * | 8/2006 | Walke et al. | 370/315 |
| 7,159,042 B1 * | 1/2007 | Morvan et al. | 709/248 |
| 7,468,953 B2 * | 12/2008 | Maegawa et al. | 370/254 |
| 2001/0005407 A1 * | 6/2001 | Kaewell, Jr. | 375/356 |
| 2001/0036810 A1 * | 11/2001 | Larsen | 455/11.1 |
| 2002/0141355 A1 | 10/2002 | Struhsaker et al. | |
| 2004/0024791 A1 * | 2/2004 | Martin et al. | 707/200 |
| 2004/0081193 A1 * | 4/2004 | Forest et al. | 370/458 |
| 2004/0169583 A1 * | 9/2004 | Meier | 340/5.31 |
| 2004/0184473 A1 | 9/2004 | Tavli et al. | |
| 2005/0259676 A1 | 11/2005 | Hwang | |
| 2006/0166616 A1 * | 7/2006 | Kwak et al. | 455/3.01 |
| 2007/0081502 A1 * | 4/2007 | Lee et al. | 370/337 |
| 2007/0153734 A1 * | 7/2007 | Lee et al. | 370/329 |
| 2007/0281613 A1 * | 12/2007 | Lee et al. | 455/15 |

FOREIGN PATENT DOCUMENTS

| | | |
|---|---|---|
| KR | 1020070036269 | 4/2007 |
| KR | 1020070045743 | 5/2007 |
| KR | 1020070072984 | 7/2007 |
| RU | 2 176 432 | 12/2000 |
| RU | 2 211 535 | 8/2003 |
| WO | WO 01/30024 | 4/2001 |
| WO | WO 2005/067173 | 7/2005 |

OTHER PUBLICATIONS

Wang et al: Multi-Hop Packet Relay MAC Protocol Considering Channel Conditions in UWB-Based WPANS, vol. 30, No. 11B. 2005.

IEEE Standard for Local and Metropolitan Area Networks; 802.16e; 864 pages; New York, NY; Feb. 28, 2006.

Kaneko et al., "Proposed Relay Method with P-MP Structure of IEEE 802.16-2004", IEEE 16th International Symposium on Personal, Indoor, and Mobile Radio Communications, 2005.

Esseling et al., "Performance Evaluation of a Fixed Relay Concept for Next Generation Wireless Systems", 2004.

\* cited by examiner

APPARATUS AND METHOD FOR SUPPORTING RELAY SERVICE IN A MULTI-HOP RELAY BROADBAND WIRELESS ACCESS COMMUNICATION SYSTEM

PRIORITY

This application claims priority under 35 U.S.C. §119 to an application filed in the Korean Intellectual Property Office on Mar. 3, 2006 and assigned Serial No. 2006-20247, and an application filed in the Korean Intellectual Property Office on Aug. 28, 2006 and assigned Serial No. 2006-81828, the contents of which are incorporated herein by reference.

BACKGROUND OF THE INVENTION

1. Field of the Invention

The present invention relates generally to a multi-hop relay Broadband Wireless Access (BWA) communication system, and in particular, to an apparatus and method for synchronously providing a direct link service and a relay link service in a multi-hop relay BWA communication system.

2. Description of the Related Art

One of the most critical requirements for deployment of a $4^{th}$ Generation (4G) mobile communication system is to build a self-configurable wireless network. The self-configurable wireless network refers to a wireless network configured in an autonomous or distributed manner without control of a central system to provide mobile communication services. For the 4G mobile communication system, cells of very small radii are defined for the purpose of enabling high-speed communications and accommodating a larger number of calls. The conventional centralized wireless network design is not self-configurable. Rather, the wireless network should be built to be under distributed control and to actively cope with an environmental change like addition of new Base Stations (BSs). That is why the 4G mobile communication system requires the self-configurable wireless network.

For real deployment of the self-configurable wireless network, techniques used for an ad hoc network should be introduced to a wireless access communication system. Such a major example is a multi-hop relay BWA communication system configured by applying a multi-hop relay scheme used for the ad hoc network to a BWA network with fixed BSs.

In general, since a BS and a Mobile Station (MS) communicate with each other via a direct link, a highly reliable radio link can be established easily between the BS and the MS in the BWA communication system. However, due to the fixedness of the BSs, the configuration of a wireless network is not flexible, making it difficult to provide an efficient service in a radio environment experiencing a fluctuating traffic distribution and a great change in the number of required calls.

The above drawback can be overcome by a relay service that delivers data over multiple hops using a plurality of neighbor MSs or neighbor Relay Stations (RSs). The use of the multi-hop relay scheme facilitates fast network reconfiguration adaptive to an environmental change and renders the overall wireless network operation efficient. Also, a radio channel in a better channel status can be provided to an MS by installing an RS between the BS and the MS and thus establishing a multi-hop relay path via the RS. High-speed data channels can be provided to MSs in a shadowing area or an area where communications with the BS are unavailable, and cell coverage can be expanded.

FIG. 1 illustrates the configuration of a typical multi-hop relay BWA communication system.

Referring to FIG. 1, in the multi-hop relay BWA communication system, MSs 140, 150, 160 and 170 (MS1 to MS4) can receive BWA services through a BS 100, a primary RS (RS1) 110, and secondary RSs (RS2) 120 and 130.

MS1 and MS2 within the coverage area 101 of the BS 100 communicate with the BS 100 via direct links L1. MS2, which is located at the cell boundary of the BS 100 and thus placed in a poor channel state, can receive a higher-speed data channel via an RS-MS link L2 provided by RS2 130 compared to the speed via the direct link L1.

MS3 and MS4 outside the coverage area 101 of the BS 100 communicate with the BS 100 via RS-MS links L3 provided by RS1 110. The communication links between the BS 100 and MS3 and MS4 via RS1 110 expand the cell coverage. MS4, which is located at the cell boundary of RS1 110 and thus placed in a poor channel state, can increase its transmission capacity using an RS-MS link L4 provided by RS2 120.

As described above, when an MS is in a poor channel state at a cell boundary of a BS or in a shadow area suffering from a severe shielding effect due to, for example, buildings, the BWA communication system enables the MS to communicate with the BS by providing a better-quality radio channel to the MS via an RS. In other words, the BS can provide a high-speed data channel to the cell boundary and the shadow area and expand its coverage area by the multi-hop relay scheme.

The RSs 110, 120 and 130 are classified into RS1 (RS 110) that expands cell coverage and RS2 (the RSs 120 and 130) that increases capacity according to their operation capabilities.

As stated above, RS1 110 serves to expand the cell coverage of the BS 100. Because MS3 and MS4 have difficulty in receiving services directly from the BS 100, they acquire synchronization to the BS 100 and perform network entry to the BS 100 via RS1 110. Therefore, RS 110 provides functionalities for the initial access of the MSs 160 and 170, that is, provides a control channel (or traffic channel) and a random access channel to MS3 and MS4.

RS2 120 and RS2 130 relay services to MS2 and MS4 within their cell coverage area, for the purpose of increasing service capacity. MS2 receives a control channel and a random access channel from the BS 100 and a traffic channel from RS2 130. MS4 receives a control channel and a random access channel from RS1 110 and a traffic channel from RS2 120.

Typically, transmission/reception is carried out between a BS and an MS in frames having the configuration illustrated in FIG. 2 in the BWA communication system. FIG. 2 illustrates a Time Division Duplex (TDD) frame structure compliant with the Institute of Electrical and Electronics Engineers (IEEE) 802.16 standard, for data transmission/reception, between the BS and the MS.

Referring to FIG. 2, a TDD frame 200 is divided into a DownLink (DL) subframe 210 and an UpLink (UL) subframe 220 with a guard region called Transmit/receive Transition Gap (TTG) in between. A guard region called Receive/transmit Transition Gap (RTG) is interposed between TDD frames.

A preamble and a common control channel are included in mandatory slots of the DL subframe 210 and broadcast to the cell coverage area of a BS. MSs within the coverage area of the BS acquire synchronization and control information from the preamble and the common control channel.

As described above, RS1 provides BWA services to MSs or RSs which have difficulty in establishing direct links with the BS as they are located outside the coverage area. Therefore, RS1 must provide control information and initial ranging slots to the MSs or the RSs, for network entry as well as user traffic service. Especially, RS1 must provide a service via an indirect link in the same configuration as via a direct link as illustrated in FIG. 3, in order to ensure backward compatibility for the MSs.

For a relay service, after receiving a control channel or a traffic channel from a BS or an MS, an RS relays them. That is why the RS carries out both transmission and reception within a single-directional subframe.

FIG. 3 illustrates a TDD frame structure in a conventional multi-hop relay BWA communication system.

Referring to FIG. 3, a single-directional subframe 300 is divided into a direct link zone 301 and an indirect link zone 303, and another single-directional subframe 310 is divided into a direct link zone 311 and an indirect link zone 313. For a relay service, predetermined parts of the subframes 300 and 310 are allocated to the indirect link zones 303 and 313. Thus, an RS receives information and data for relaying in the direct link zones 301 and 311 and relays them in the indirect link zones 303 and 313.

For instance, RS1 receives control information and a traffic burst to be relayed from the BS or an MS in the direct link zone 301 or 311 and then relays them to the BS or the MS in the indirect link zone 303 or 313.

RS2 receives unicast traffic bursts to be relayed from an MS or the BS in the direct link zone 311 or 301 and then relays them to the MS or the BS in the indirect link zone 303 or 313.

When communications are conducted in the frame structure illustrated in FIG. 3, a different node that provides a BWA service has a different frame timing, i.e. different nodes operate asynchronously in the BWA communication system, as illustrated in FIG. 4.

FIG. 4 is a diagram illustrating transmission and reception timings of MSs in the conventional multi-hop relay BWA communication system.

Referring to FIG. 4, an MS that receives a direct link service from a BS has the timing of a BS frame 421 because communications are made in direct link zones 401 and 411. On the other hand, an MS that receives a relay link service from an RS has the timing of an RS frame 423 because communications are made in indirect link zones 403 and 413.

Typically, synchronization and handover are carried out based on control information and preamble transmitted to a fixed position in a frame in the BWA communication system. However, since MSs operate asynchronously depending on the subject that provides them with service as illustrated in FIG. 4, the handover and synchronization are very difficult as illustrated in FIG. 5.

FIG. 5 illustrates signal flows when MSs move in the conventional multi-hop relay BWA communication system.

Referring to FIG. 5, when an MS 520 (MS1) moves from a BS 500 to the coverage area of RS1 510 while receiving a service from the BS 500, MS1 must receive a preamble and control information from RS1 510.

When an MS 530 (MS2) moves from RS1 510 to the BS 500 during receiving a service from RS1 510, MS2 must receive a preamble and control information from the BS 500.

As illustrated in FIG. 3, however, the BS 500 and RS1 510 operate asynchronously, thereby making it difficult for MS1 and MS2 to acquire the preamble and the control information after the handover.

Moreover, since the BS provides a service to the MSs and the RS simultaneously in a direct link subframe, as illustrated in FIG. 3, the freedom of configuring a system in which the BS supports the RS is low.

SUMMARY OF THE INVENTION

An aspect of the present invention is to substantially solve at least the above problems and/or disadvantages and to provide at least the advantages below. Accordingly, an aspect of the present invention is to provide a frame configuration method for enabling an MS to perform handover and acquire synchronization efficiently and an apparatus supporting the same in a multi-hop relay BWA communication system.

Another aspect of the present invention is to provide a frame configuration method for increasing the freedom of configuring relay links and an apparatus supporting the same in a multi-hop relay BWA communication system.

A further aspect of the present invention is to provide an apparatus and method for synchronizing between a direct link service and a relay link service by configuring a subframe including a connection-link subframe and a relay-link subframe in a multi-hop relay BWA communication system.

According to an aspect of the present invention, there is provided a method for configuring a subframe to support a relay service in a multi-hop relay BWA communication system, in which a first zone of the subframe is configured for at least one of communication between a BS and a first MS within the coverage area of the BS and communication between each RS and a second MS within the coverage area of the RS, and a second zone of the subframe is configured for at least one of communication between the BS and the each RS and communication between the RS and another RS.

According to another aspect of the present invention, there is provided a method for configuring a subframe to support a relay service in a multi-hop relay BWA communication system, in which a first zone of the subframe is configured for at least one of BS-MS communication and RS-MS communication, a second zone of the subframe is configured for at least one of BS-RS communication, RS-RS communication, and RS-MS communication, and a third zone of the subframe is configured for at least one of BS-MS communication and RS-RS communication.

According to a further aspect of the present invention, there is provided a method of a BS for supporting a relay service in a multi-hop relay BWA communication system, in which the BS communicates with an MS in a first zone of a subframe according to a predetermined subframe configuration, and communicates with an RS in a second zone of the subframe.

According to still another aspect of the present invention, there is provided a method of an RS for supporting a relay service in a multi-hop relay BWA communication system, in which the RS performs network entry based on control information received from a higher node and acquires subframe configuration information for supporting the relay service, receives a synchronization channel, control information, and a traffic burst from the higher node for a second zone of a subframe in an $n^{th}$ frame, and sends a synchronization channel and the received control information and traffic burst to an MS for a first zone of the subframe in an $(n+1)^{th}$ frame.

According to yet another aspect of the present invention, there is provided an apparatus for supporting a relay service in a multi-hop relay BWA communication system, in which a timing controller provides a transmission and reception timing signal for a signal for an MS-communication zone for communicating with an MS and a signal for an RS-communication zone for communicating with an RS according to a frame configuration, an RF duplexer separates the signal for the MS-communication zone from the signal for the RS-communication zone, and a transceiver communicates with one of the MS and the RS according to the transmission and reception timing signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for synchronizing between services provide from a BS and an RS to MSs and increasing the freedom of configuring relay-link areas in a frame in a multi-hop relay BWA communication system.

The following description will be made in the context of a Time Division Duplex (TDD)-Orthogonal Frequency Division Multiple Access (OFDM) wireless communication system, while the present invention is also applicable to a communication system using any other multiple access scheme or a Frequency Division Duplex (FDD) communication system. Herein, the term "a primary RS" or "RS1" is defined as a high-capability RS that provides a control signal to an expanded coverage area. The term "a secondary RS" or "RS2" is defined as a low-capability RS that relays mainly traffic bursts for an increase in capacity, and further does not provide a control signal.

Figure 1:
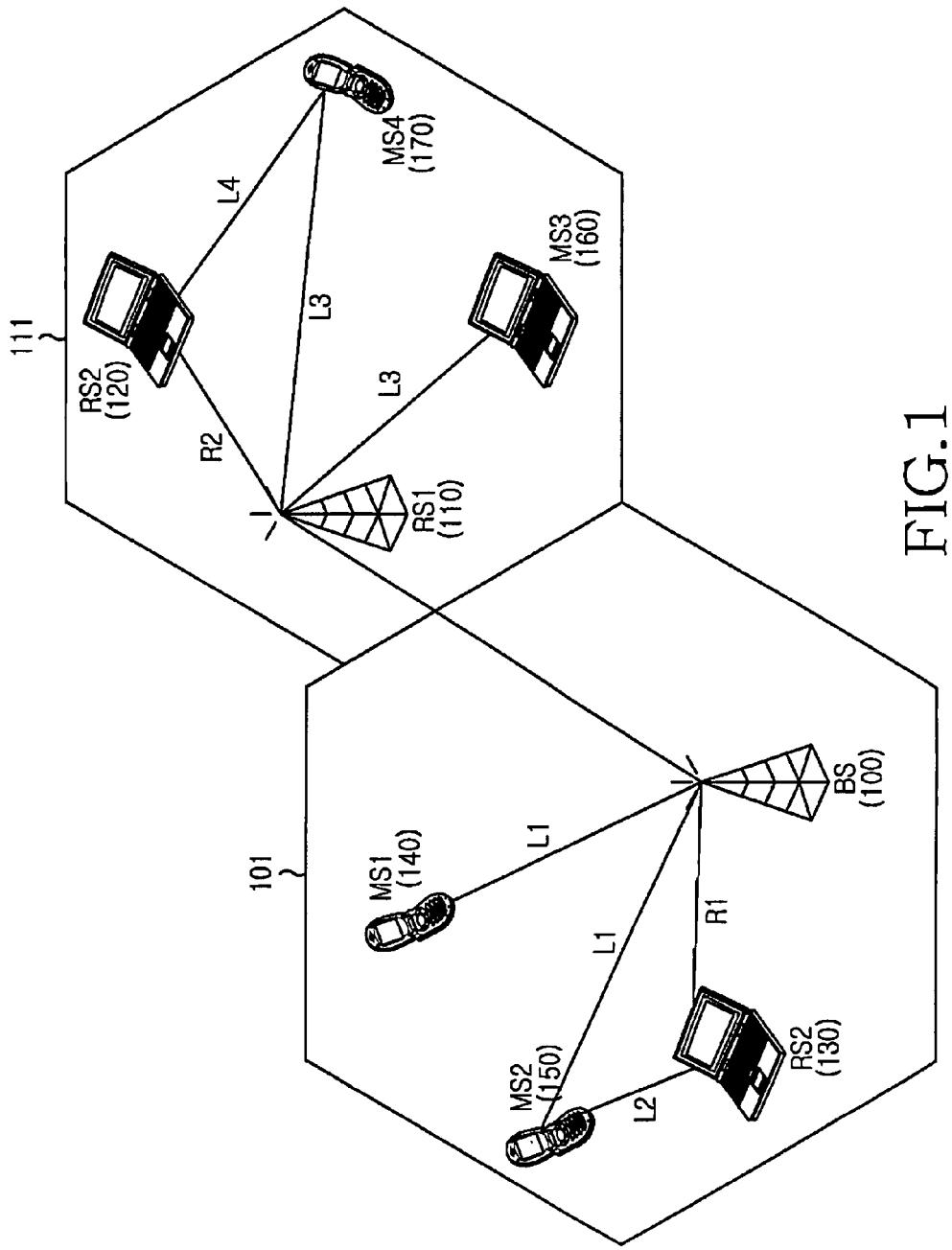
FIG. 1 illustrates service provisioning by a multi-hop relay scheme in a typical BWA communication system.
Figure 2:
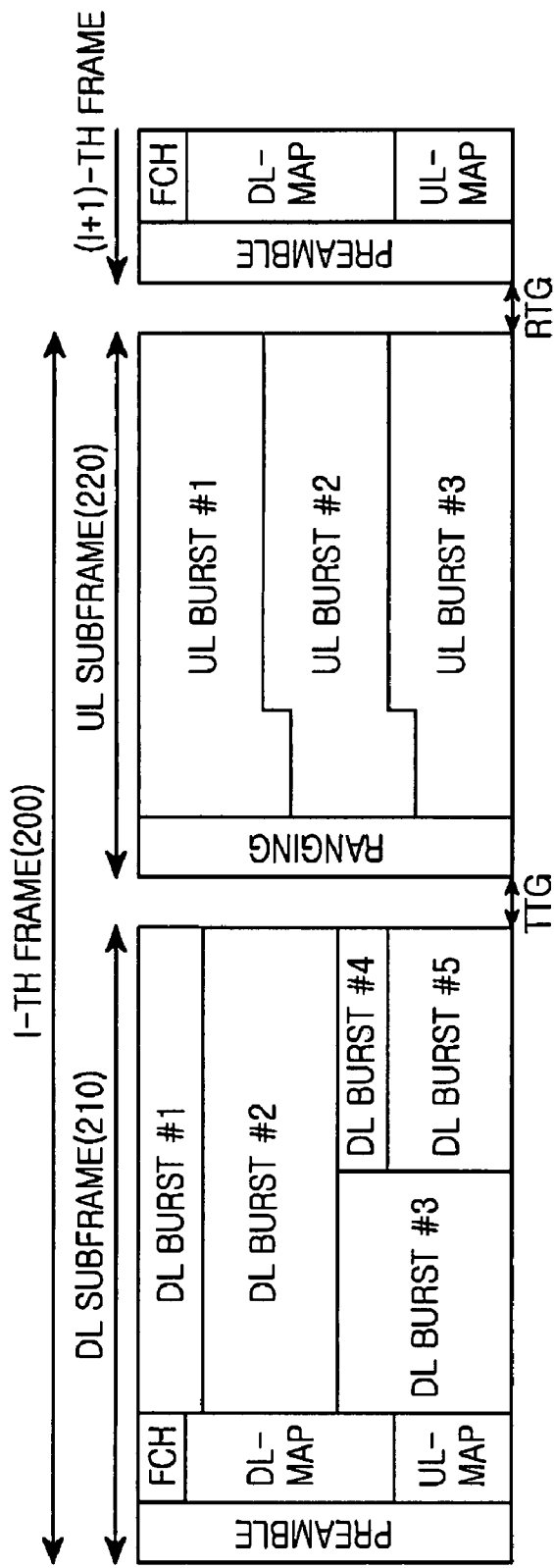
FIG. 2 illustrates a TDD frame structure in the typical BWA communication system.
Figure 3:
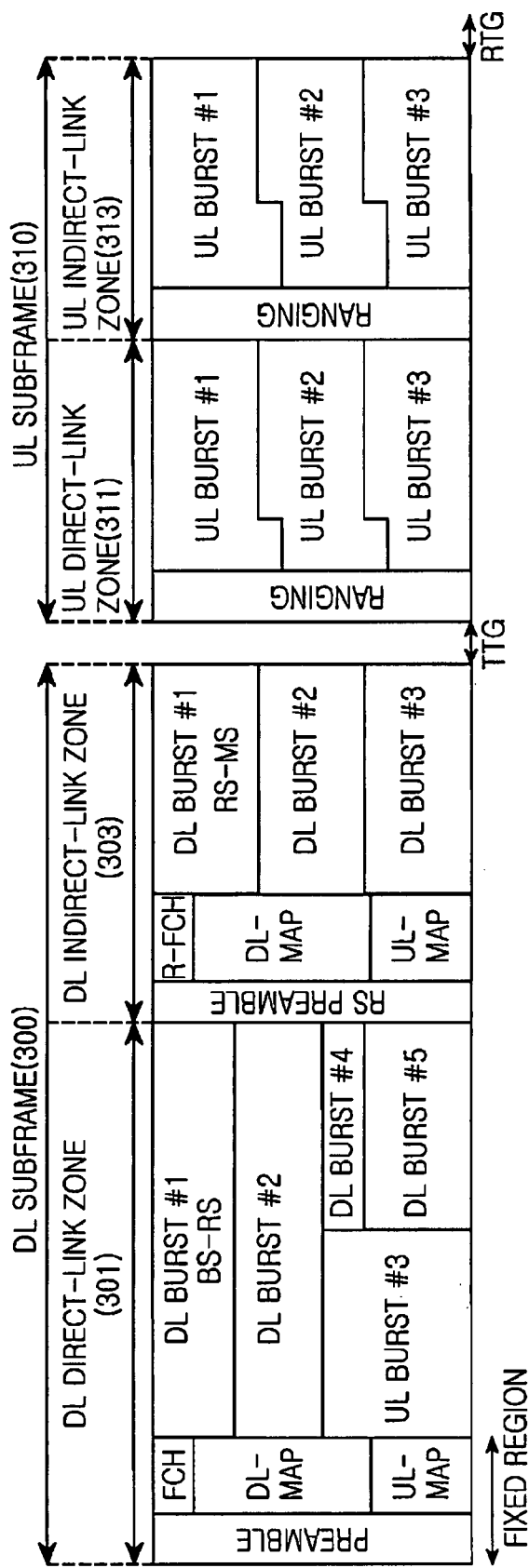
FIG. 3 illustrates a TDD frame structure in a conventional multi-hop relay BWA communication system.
Figure 4:
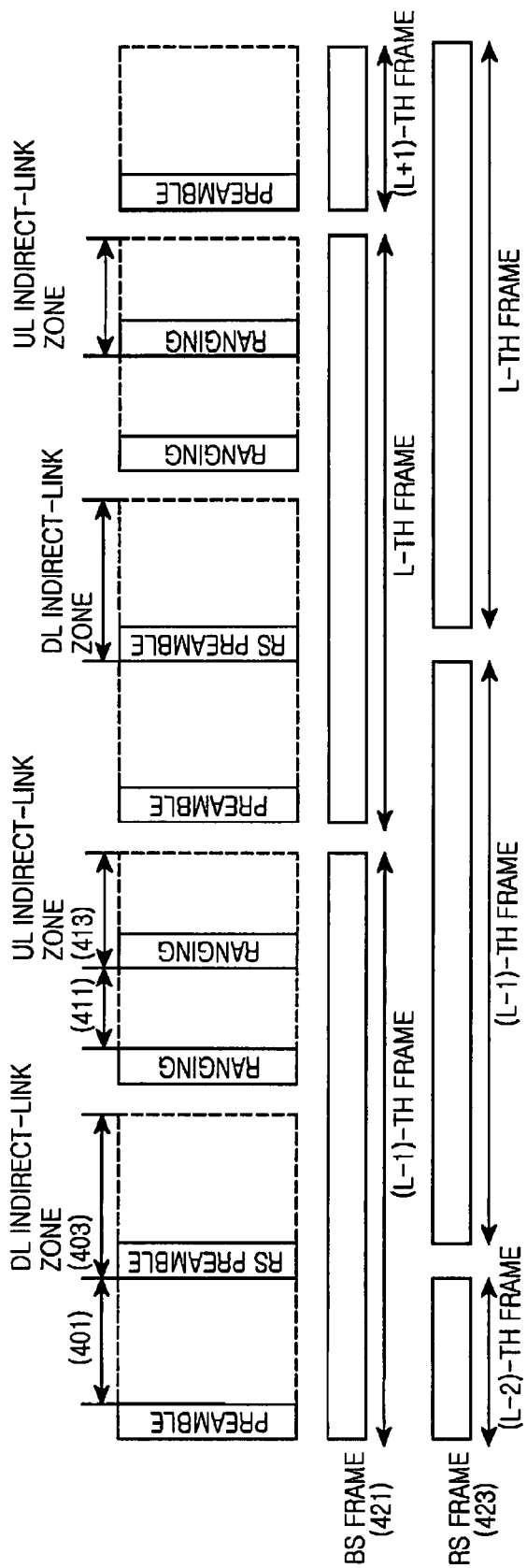
FIG. 4 is a diagram illustrating transmission and reception timings of MSs in the conventional multi-hop relay BWA communication system.
Figure 5:
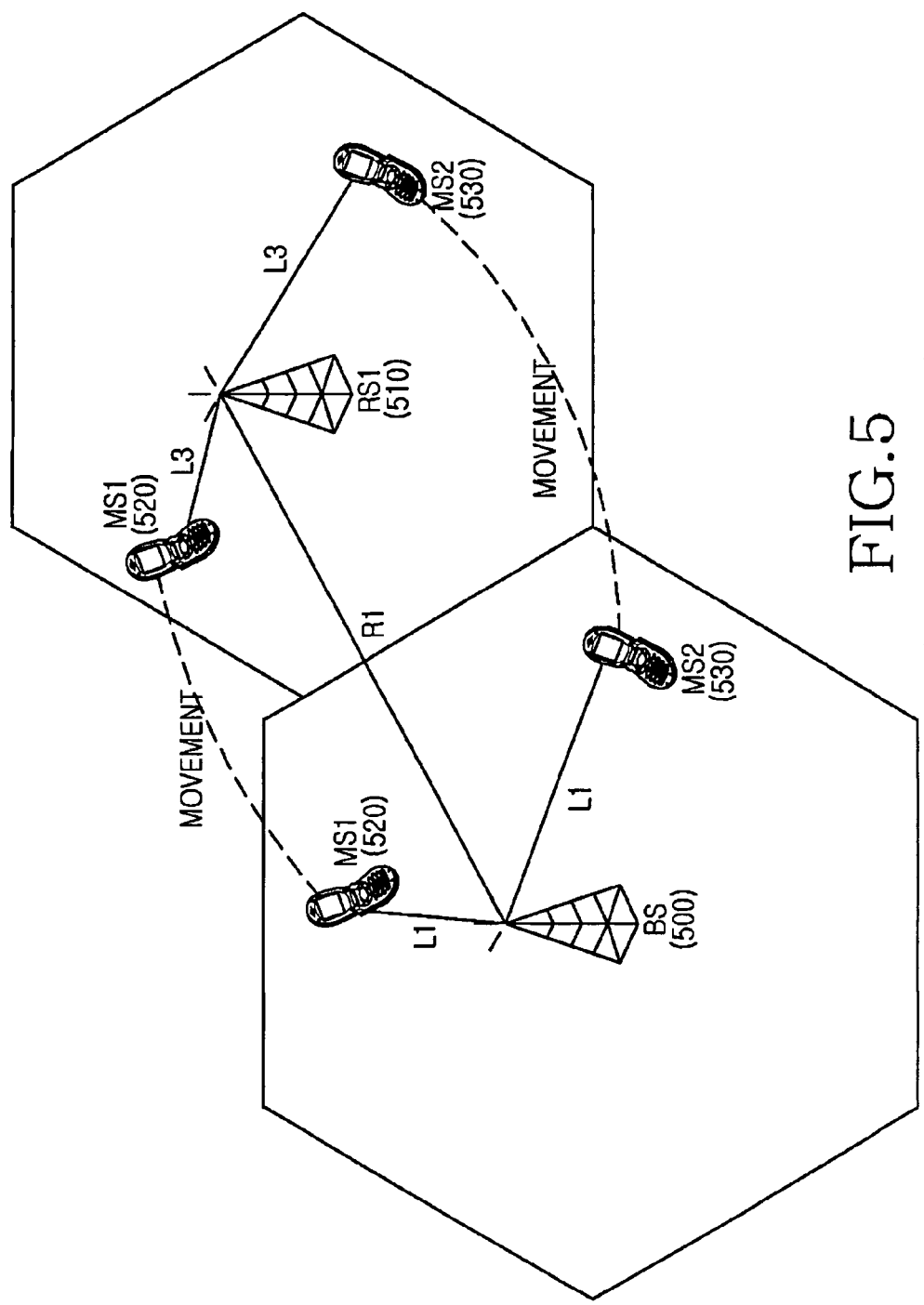
FIG. 5 illustrates signal flows when MSs move in the conventional multi-hop relay BWA communication system.
Figure 6:
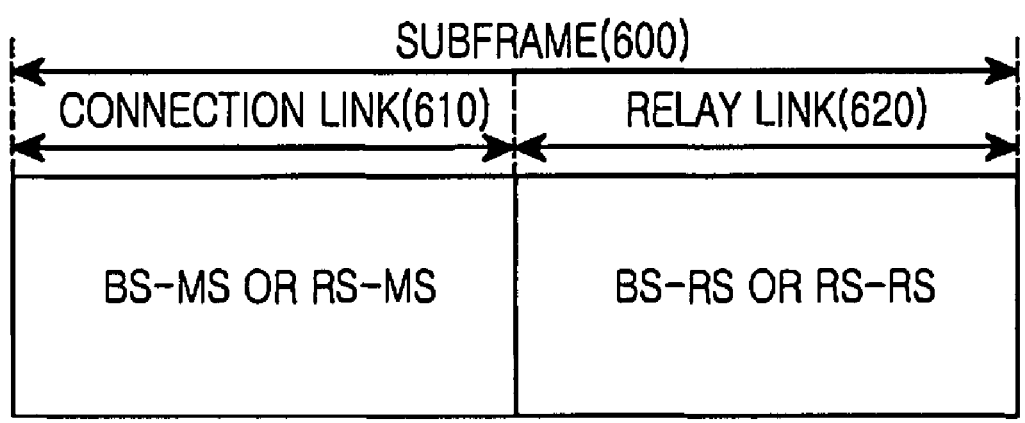
FIG. 6 illustrates a subframe structure in a multi-hop relay BWA communication system according to the present invention.

In the BWA communication system, a subframe is divided into a connection-link subframe and a relay-link subframe in order to send a direct link service and a relay link service with the same timing, synchronously, as illustrated in FIG. 6. The direct link is a link via which a BS or an RS communicates with an MS, and the relay link is a link via which the BS communicates with the RS or the RS communicates with a lower RS. The connection-link subframe is configured in compliance with IEEE 802.16.

FIG. 6 illustrates a subframe structure in a multi-hop relay BWA communication system according to the present invention.

Referring to FIG. 6, a subframe 600 is divided into a connection-link subframe 610 and a relay-link subframe 620. The connection-link subframe 610 and the relay-link subframe 620 are distinguished by time division.

On the downlink, the connection-link subframe 610 is distinguished from the relay-link subframe 620 according to signal destinations. BS-MS transmission or RS-MS transmission takes place in the connection-link subframe 610, while BS-RS or higher RS-lower RS transmission takes place in the relay-link subframe 620.

On the uplink, the connection-link subframe 610 is distinguished from the relay-link subframe 620 according to signal sources. MS-BS transmission or MS-RS transmission occurs in the connection-link subframe 610, while lower RS-higher RS transmission or RS-BS transmission occurs in the relay-link subframe 620.

In the connection-link subframe, a BS and an RS transparently communicate with the MS. In other words, the BS and the RS provide services such that the MS is not aware of a distinction between a direct link service and a relay link service and the MS is aware of communication with the BS. If information travels over multiple hops in the BWA communication system, the relay-link subframe 620 may be separated into a plurality of areas according to the number of multiple-hop links.

Figure 7:
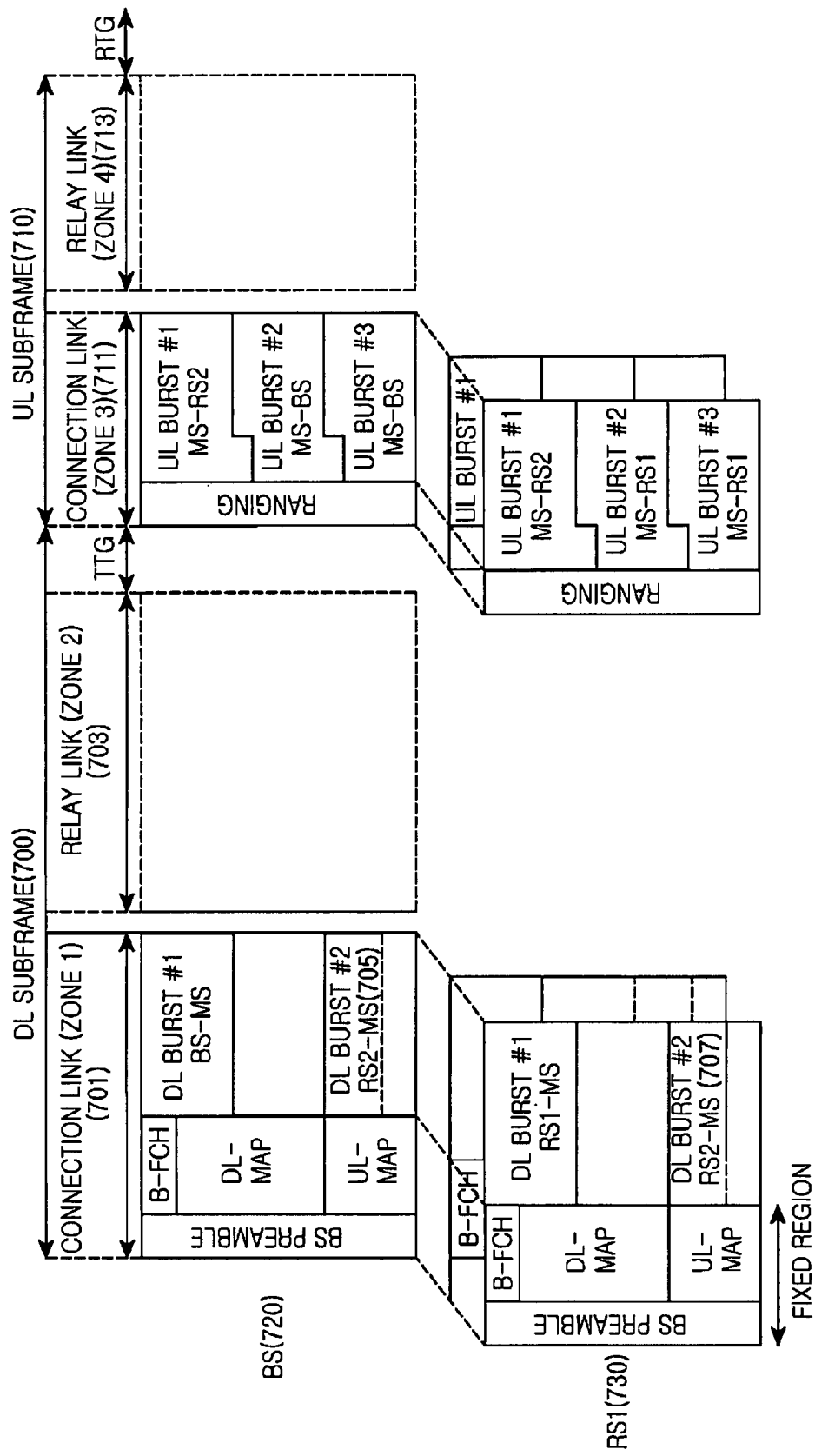
FIG. 7 illustrates a frame structure in the multi-hop relay BWA communication system according to the present invention.

Based on the subframe structure illustrated in FIG. 6, a frame can be configured in the fashion illustrated in FIG. 7.

FIG. 7 illustrates a frame structure in the multi-hop relay BWA communication system according to f the present invention.

Referring to FIG. 7, a frame is divided into a DL subframe 700 and a UL subframe 710. According to the subframe structure illustrated in FIG. 6, a connection-link subframe 701 and a relay-link subframe 703 are time-multiplexed in the DL subframe 700, while a connection-link subframe 711 and a relay-link subframe 713 are time-multiplexed in the UL subframe 710.

In each of the subframes 700 and 710, the connection-link subframe 701 or 711 precedes, the relay-link subframe 703 or 713 in order to transparently notify MSs of the preamble-based start of the frame and the position of a TTG.

A BS 720 and RS1 730 communicate with MSs that they serve in the connection-link subframes 701 and 711. Notably, a direct link service from the BS 720 and a relay link service from RS1 730 are provided in the connection-link subframes 701 and 711 by Frequency Division Multiplexing (FDM), Spatial Division Multiplexing (SDM), or Orthogonal Frequency Division Multiplexing (OFDM).

For transparent relaying, RS1 730 provides control information and a traffic burst to an MS in the same manner as the BS 720 provides the direct link service to an MS. RS2 is allocated a predetermined burst zone 705 or 707 from the BS 720 or RS1 730 and provides a unicast traffic channel to an MS in the burst zone 705 or 707.

In the relay-link subframes 703 and 713, the BS 720 communicates with RS1 730 or RS1 730 communicates with its lower RS. The relay-link subframes 703 and 713 have a fixed length or a variable length according to a cell environment. An advanced technology may applied, which can define a new function and usage for the relay-link subframes 703 and 711, and thus the configuration of the relay-link subframes 703 and 711 is not be specified in FIG. 7.

Figure 8A:
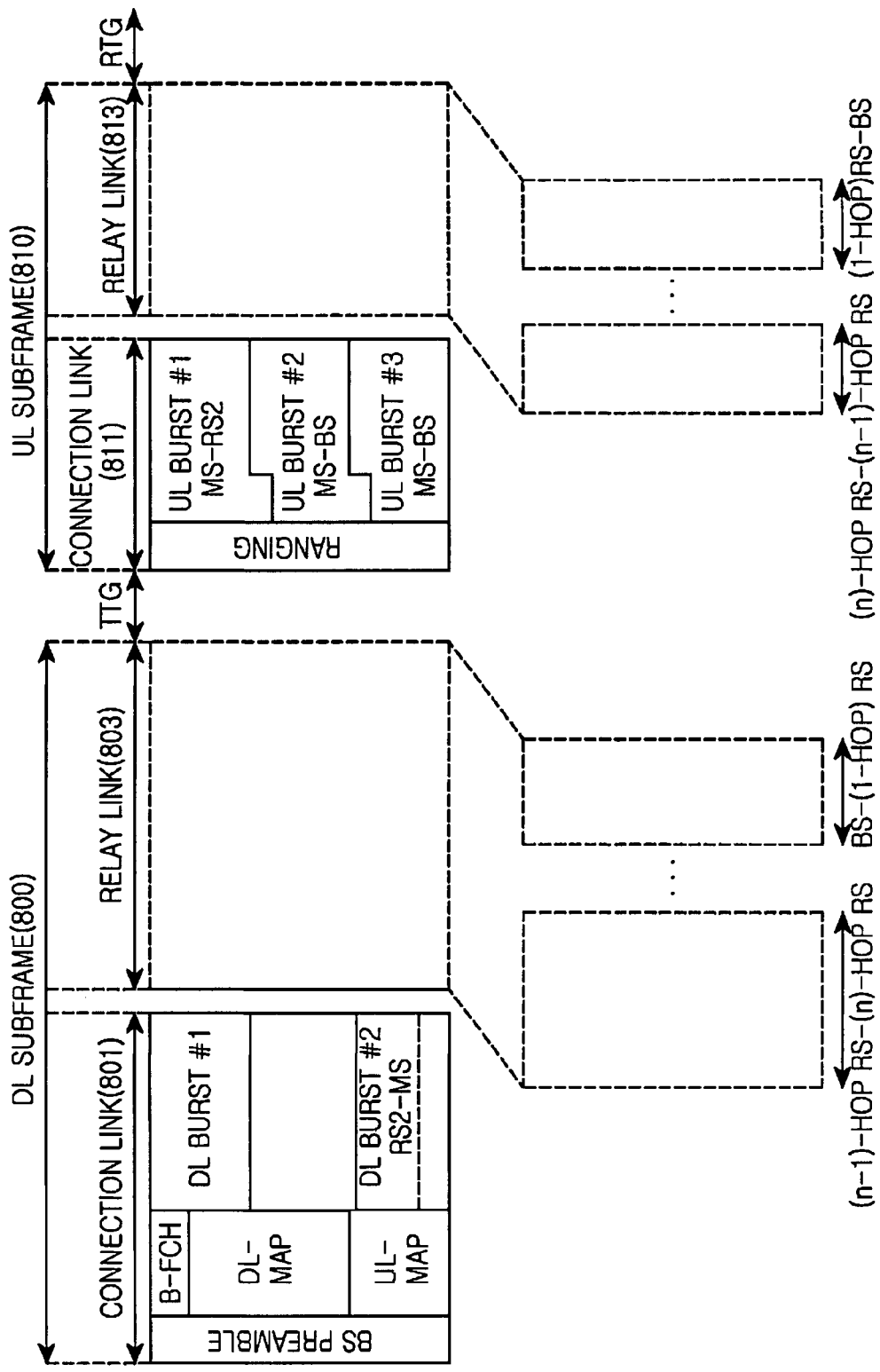
FIGS. 8A and 8B illustrate relay-link subframe structures in the multi-hop relay BWA communication system according to the present invention.
Figure 8B:
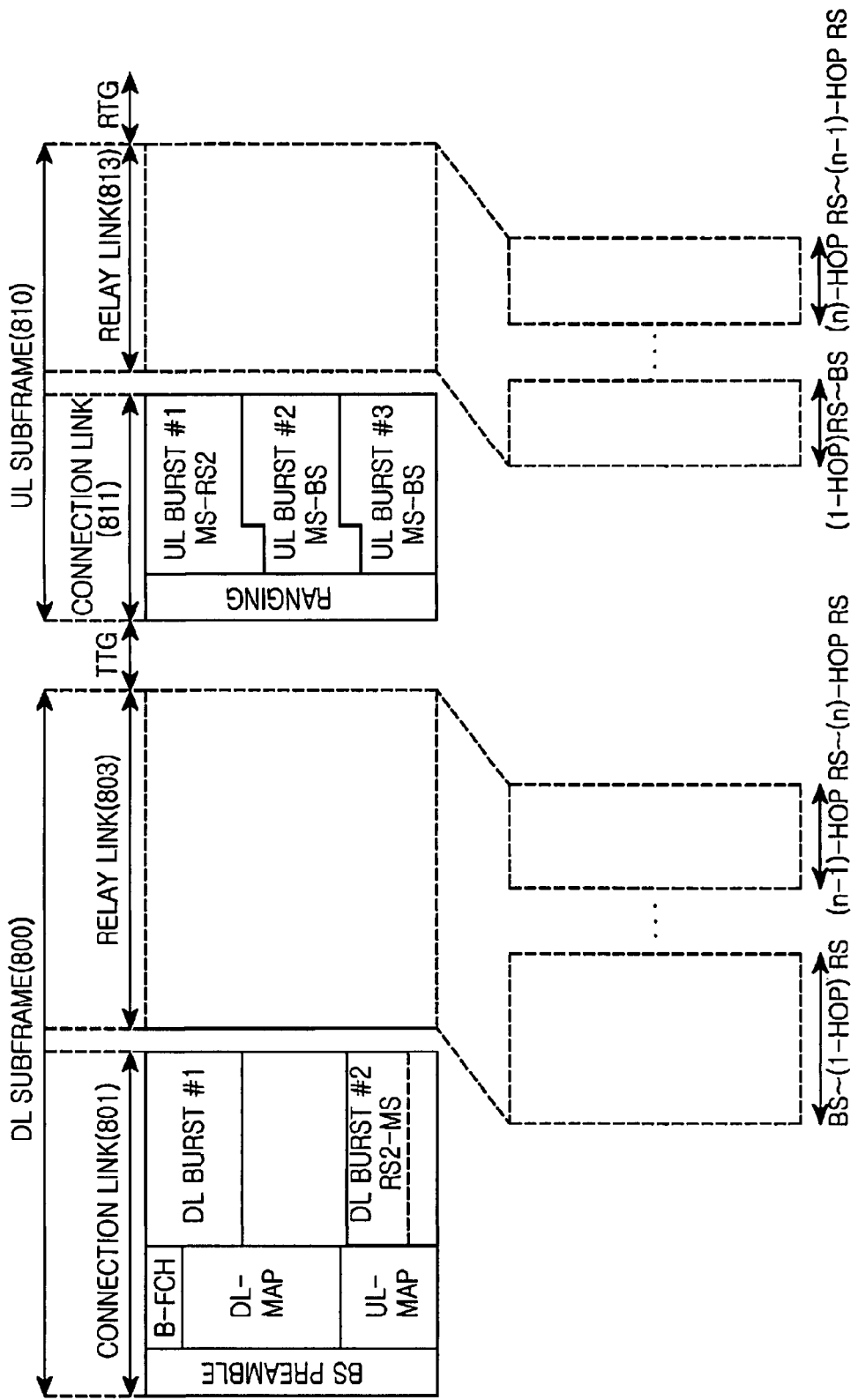

In the case where the BWA communication system is expanded to multiple hops, the relay-link subframes 703 and 713 may be time-divided according to the number of multi-hop links, as illustrated in FIGS. 8A and 8B.

FIGS. 8A and 8B illustrate relay-link subframe structures in the multi-hop relay BWA communication system according to the present invention. A relay-link subframe may be configured to include control channels and traffic channels of various structures.

Referring to FIGS. 8A and 8B, relay-link subframes 803 and 813 each are divided according to the number of multiple hops.

In FIG. 8A, zones for relay links are multiplexed in the relay-link subframes 803 and 813 in a descending hop number order. Specifically, the link between an (n−1)-hop RS and an n-hop RS precedes the link between the BS and a one-hop RS in the multiplexed relay-link subframes 803 and 813.

In FIG. 8B, zones for relay links are multiplexed in the relay-link subframes 803 and 813 in an ascending order of hop number. Specifically, the link between the BS and the one-hop RS precedes the link between the (n−1)-hop RS and the n-hop RS in the multiplexed relay-link subframes 803 and 813. Herein, the number of hops in the system refers to the number of RSs.

Figure 9:
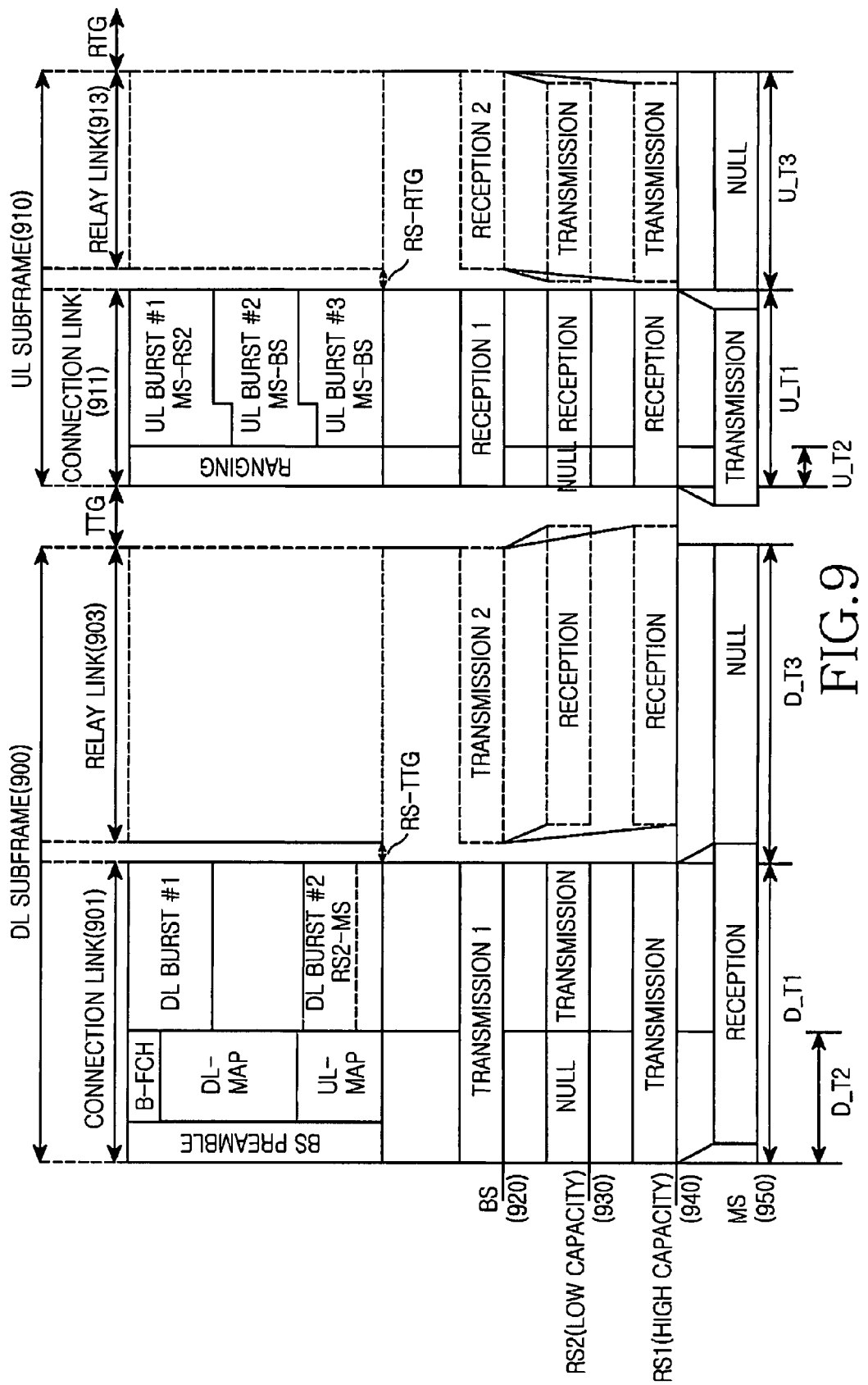
FIG. 9 illustrates timings of a BS, an MS, and RSs in the multi-hop relay BWA communication system according to the present invention.

As illustrated in FIGS. 7, 8A and 8B, the BS provides a service to RS1 or an MS, and RS1 provides a service to an MS or RS2 in the separate connection-link subframe and relay-link subframe of a single-directional subframe. The BS and the RSs start frames at the same timing as illustrated in FIG. 9. That is, the BS and the RSs synchronously (with the same timing) provide a connection link service to the MSs.

FIG. 9 illustrates timings of a BS, an MS, and RSs in the multi-hop relay BWA communication system according to the present invention. The following description is made in the context of a 2-hop relay system. Hence, RS1 and RS2 provide a one-hop relay service to different MSs.

Referring to FIG. 9, a BS 920 sends control information and a traffic burst to an MS that it serves in a connection-link subframe 901 of a DL subframe 900 during time period D_t1. The BS 920 also sends control information and a traffic burst to RS1 940 and RS2 930 in a relay-link subframe 903 during time period D_t3.

RS1 940 sends control information and a traffic burst to an MS that it serves in the connection-link subframe 901 during time period D_t1, and receives control information and a traffic burst for relaying from the BS 920 in the relay-link subframe 903 during time period D_t3. If the BWA communication system is expanded to three or more hops and includes a 2-hop relay system, RS1 940 divides the time slots of the relay-link subframe 903 and sends control information and a traffic burst to an RS at the next hop in a predetermined time slot of the relay-link subframe 903. The size of time slots multiplexed in the relay-link subframe 903 is adaptively decided according to the number of multiple hops and the channel status.

A control channel period D_t2 is null for RS2 930 in the connection-link subframe 901 and RS2 930 sends a unicast traffic burst to an MS during the remaining period, i.e. D_t1-D_t2. In the relay-link subframe 903, RS2 930 receives control information and a traffic burst for relaying from the BS 920 during time period D_t3.

An MS 950 receives a control channel and a traffic burst from the BS 920 or an RS in the connection-link subframe 901. In the relay-link subframe 903, the MS 950 neglects the relay-link subframe 903, having determined that the subframe 903 is not allocated to itself and thus is placed in idle mode.

During the period of the UL subframe 910, the BS 920 receives initial ranging information and a traffic burst from the MS in the connection-link subframe 911 during time period U_t1 and receives initial ranging information and traffic bursts from RS1 940 and RS2 930 in the relay-link subframe 913 during time period U_t3.

RS1 940 receives the initial ranging information and a traffic burst for relaying from the MS during time period U_t1 in the connection-link subframe 911. RS1 940 also sends the initial ranging information and the traffic bursts to the BS 920 during time period U_t3 in the connection-link subframe 913. RS1 940 compensates for the delay of a radio channel before the signal transmission.

In the connection-link subframe 911, a control channel period U_t2 is null for RS2 930 and RS2 930 receives a traffic burst for relaying from the MS during the remaining period U_t1-U_t2. RS2 930 sends the unicast traffic bursts to the BS 920 during time period U_t3 in the relay-link subframe 913. RS2 930 compensates for the delay of a radio channel before the signal transmission.

In the connection-link subframe 911, the MS 950 sends initial ranging information and traffic bursts to the BS 920 or the RS during time period U_t1. the MS 950 compensates for the delay of a radio channel before the signal transmission.

The MS 950 neglects the relay-link subframe 913, having determined that the subframe 913 is not allocated to itself.

As described above, the RSs are switched between transmission and reception in the single-directional subframes. Accordingly, guard regions (e.g. RS TTG and RS RTG) are required in the DL subframe 900 and the UL subframe 910. For example, each of the guard regions can be formed by setting a short preamble in the first symbol of the relay-link subframe, so that the RSs can operate in a switched operation mode during the remaining period of the relay-link subframe. The short preamble can be created by reducing the number of repeated sequences that form the preamble of the frame.

Alternatively, the BS forms a predetermined gap between the connection-link subframe 901 and the relay-link subframe 903 so that the RS can operate in a switched operation mode.

Figure 10:
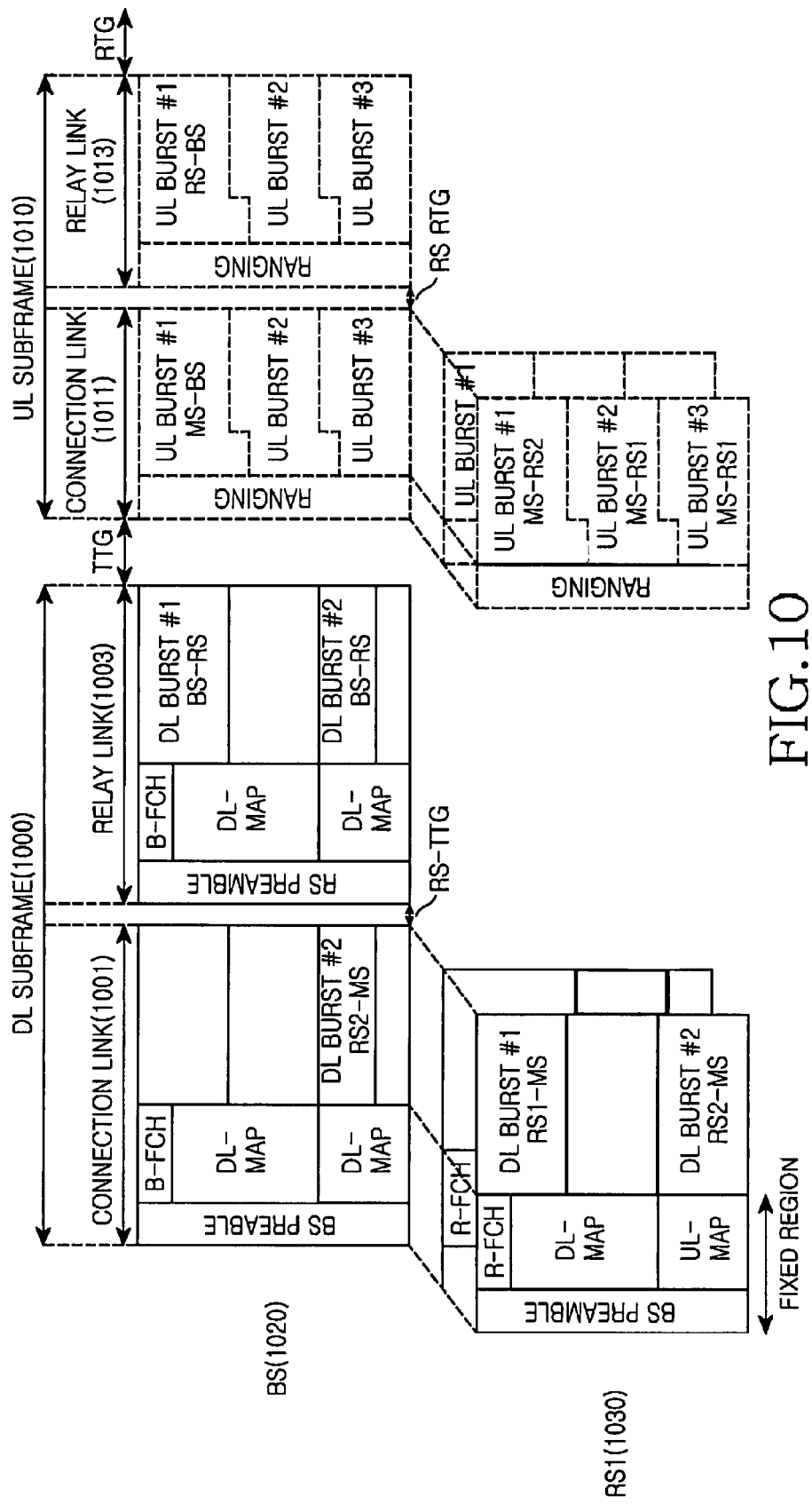
FIG. 10 illustrates a frame structure in the multi-hop relay BWA communication system according to the present invention.

FIG. 10 illustrates a frame structure in the multi-hop relay BWA communication system according to another embodiment of the present invention. This embodiment is characterized in that the configuration of a connection-link subframe is identical to the configuration of a relay-link subframe.

Referring to FIG. 10, in a 2-hop relay system, a DL subframe 1000 is divided into a connection-link subframe 1001 and a relay-link subframe 1003, and a UL subframe 1010 is divided into a connection-link subframe 1011 and a relay-link subframe 1013.

A direct link service from a BS and a relay link service from an RS are provided in FDM, SDM, or OFDM in the connection-link subframes 1001 and 1011.

The BS communicates with the RS in the relay-link subframes 1003 and 1013.

Figure 11:
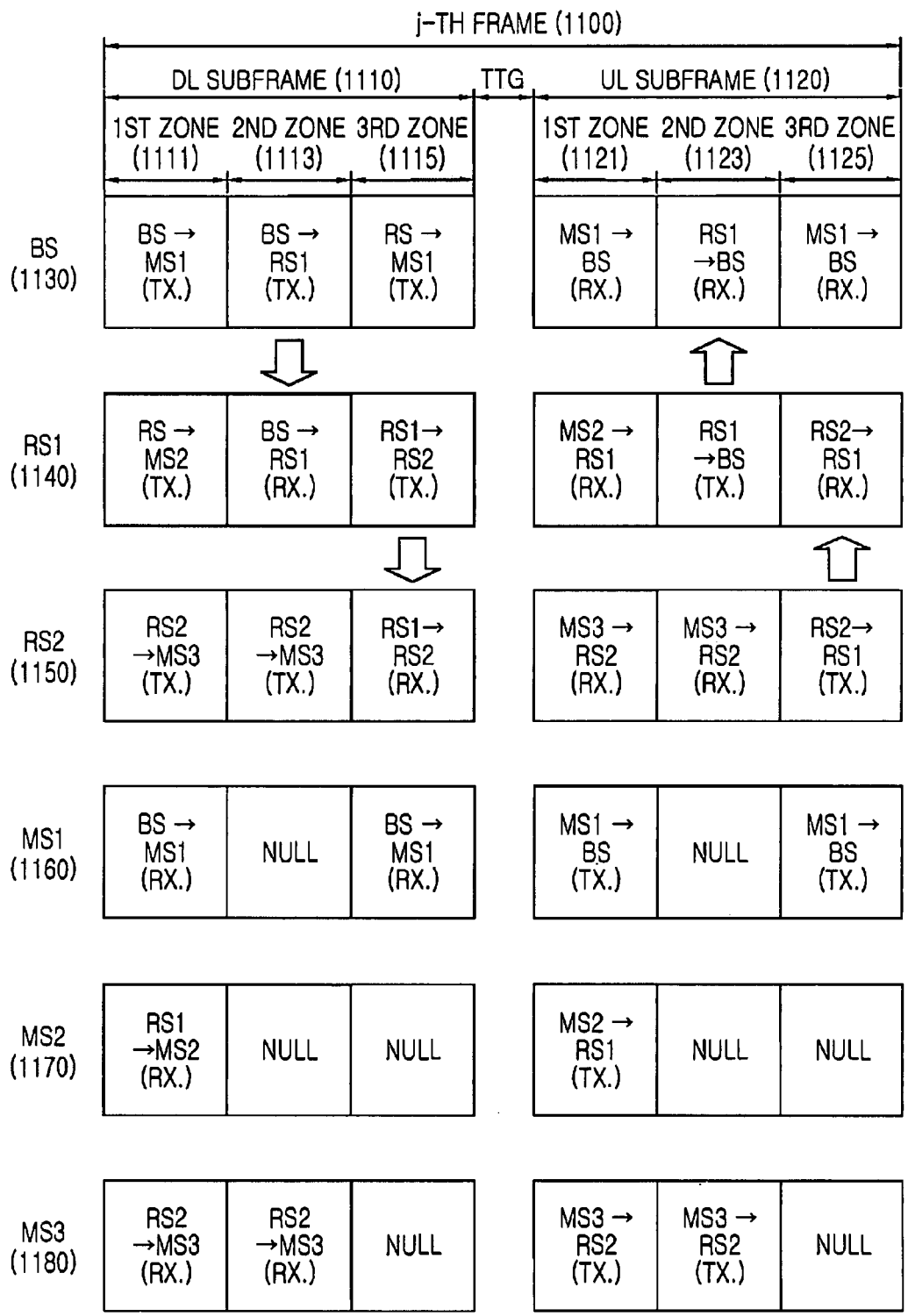
FIG. 11 illustrates a frame structure in a 3 or more-hop BWA communication system according to the present invention.

The above embodiment illustrates a frame structure for supporting a relay service in a two-hop relay BWA communication system. If the BWA communication system is expanded to three or more hops, the frame structure illustrated in FIG. 8 may be constructed in the specific form illustrated in FIG. 11. With reference to FIG. 11, multiplexing of two relay-link zones in a relay-link subframe to provide a relay service over multiple hops will be described.

FIG. 11 illustrates a frame structure for a 3 or more-hop relay BWA communication system according to an embodiment of the present invention. The following description is made with the appreciation that a BS, RSs, and MSs communicate in spatially multiplexed frames sharing one frequency. Herein, RS1 is a one-hop RS that receives data directly from the BS and relays the data, and RS2 is a two-hop RS that receives data from the BS via RS1 and relays the data.

Referring to FIG. 11, a $j^{th}$ frame 1100 is divided into a DL subframe 1110 and a UL subframe 1120. The DL subframe 1110 is further divided into a first zone 1111, a second zone 1113, and a third zone 1115. The UL subframe 1120 is further divided into a first zone 1121, a second zone 1123, and a third zone 1125. The second and third zones 1113 and 1115 correspond to the multiplexed relay-link subframe 803 illustrated in FIG. 8, and the second and third zones 1123 and 1125 correspond to the multiplexed relay-link subframe 813 illustrated in FIG. 8.

The first zones 1111 and 1121 include BS-MS link subframes for communications between a BS 1130 and a first MS 1160 (MS1) and RS-MS link subframes for communications between RS1 1140 and a second MS 1170 (MS2) and between RS2 1150 and a third MS 1180 (MS3). The second zones 1113 and 1123 include BS-RS link subframes and RS-MS link subframes. If the system operates over four or more hops, the second zones 1113 and 1123 include BS-RS link subframes, RS-RS link subframes, and RS-MS link subframes. The third zones 1115 and 1125 include BS-MS link subframes and RS-RS link subframes.

A TTG exists between the DL subframe 1110 and the UL subframe 1120.

When a multi-hop relay service is supported by the $j^{th}$ frame 1100, the BS 1130 sends downlink data to MS1 that BS 1130 serves in the first and third zones 1111 and 1115. The BS 1130 also sends downlink data to RS1 1140 in the second zone 1113.

The BS 1130 receives uplink data from MS1 in the first zone 1121 and the third zone 1125 of the UL subframe 1120. The BS 1130 also receives uplink data from RS1 1140 in the second zone 1123.

RS1 1140 sends downlink data to MS2 that it serves in the first zone 1111 of the DL subframe 1110. RS1 1140 also receives downlink data from the BS 1130 in the second zone 1113. In the third zone 1115, RS1 1140 sends downlink data to RS2 1150.

In the UL subframe 1120, RS1 1140 receives uplink data from MS2 in the first zone 1121 and sends uplink data to the BS 1130 in the second zone 1123. In the third zone 1125, RS1 1140 receives uplink data from RS2 1150.

In the DL subframe 1110, RS2 1150 sends downlink data to MS3 that RS2 1150 serves in the first and second zones 1111 and 1113 and receives downlink data from RS1 1140 in the third zone 1115.

In the UL subframe 1120, RS2 1150 receives uplink data from MS3 in the first and second zones 1121 and 1123 and sends uplink data to RS1 1140 in the third zone 1125. If the system operates over four or more hops, RS2 1150 can communicate with a lower RS instead of MS3 in the second zones 1113 and 1123. That is, for the three-hop system, RS2 1150 is a last-hop RS and thus RS2 1150 communicates with MS3 instead of a lower RS.

MS1, MS2 and MS3 receive downlink data from nodes to which they are linked in the DL subframe 1110 and send uplink data to the nodes in the UL subframe 1120 of the $j^{th}$ frame 1100.

For example, MS1 receives downlink data from the BS 1130 in the first and third zones 1111 and 1115 of the DL subframe 1110 and sends uplink data to the BS 1130 in the first and third zones 1121 and 1125 of the UL subframe 1120.

MS2 receives downlink data from RS1 1140 in the first zone 1111 of the DL subframe 1110 and sends uplink data to RS1 1140 in the first zone 1121 of the UL subframe 1120.

MS3 receives downlink data from RS2 1150 in the first and second zones 1111 and 1113 of the DL subframe 1110 and sends uplink data to RS2 1150 in the first and second zones 1121 and 1123 of the UL subframe 1120.

Figure 12:
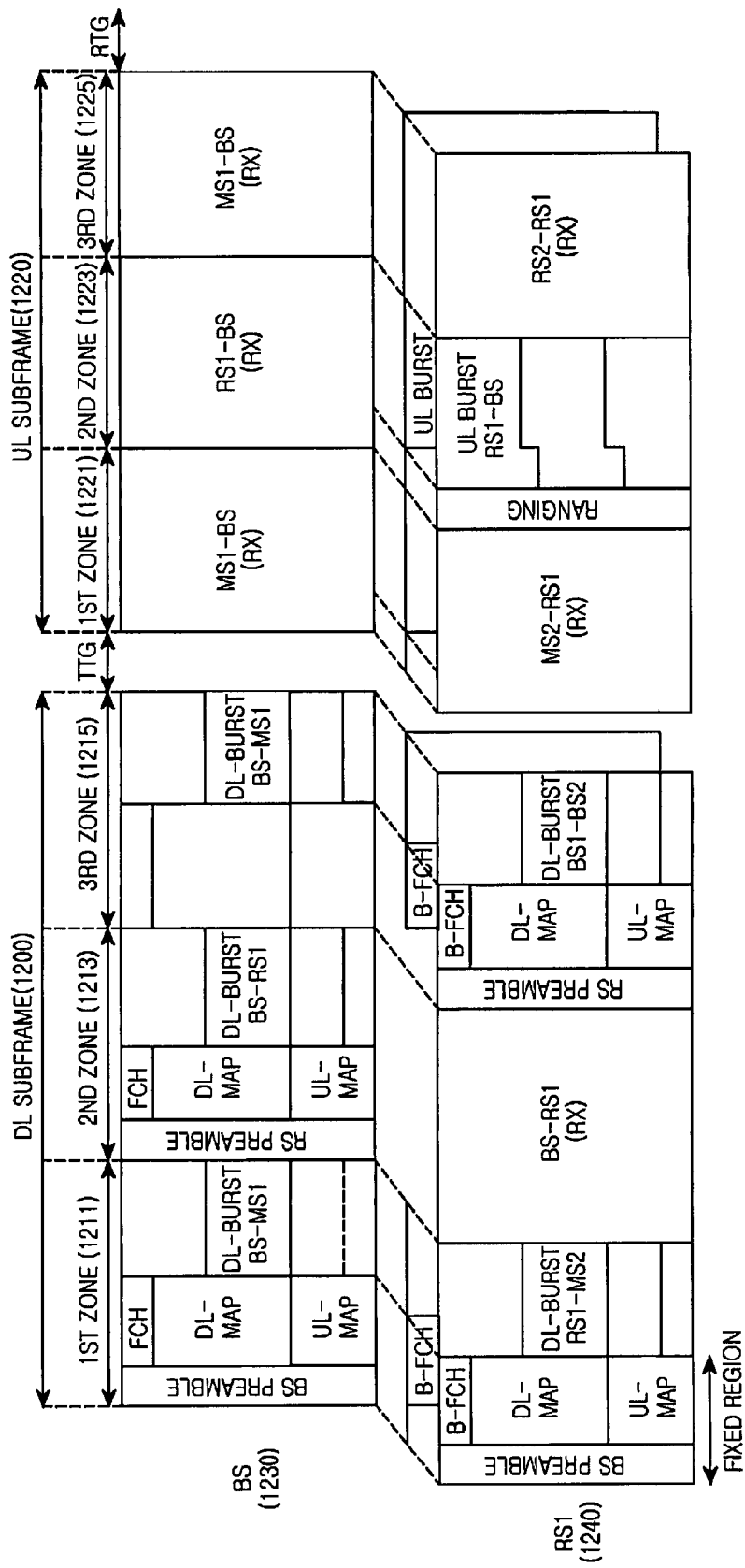
FIG. 12 illustrates a frame structure for a BS and RS1 in the 3 or more-hop relay BWA communication system according to the present invention.
Figure 13:
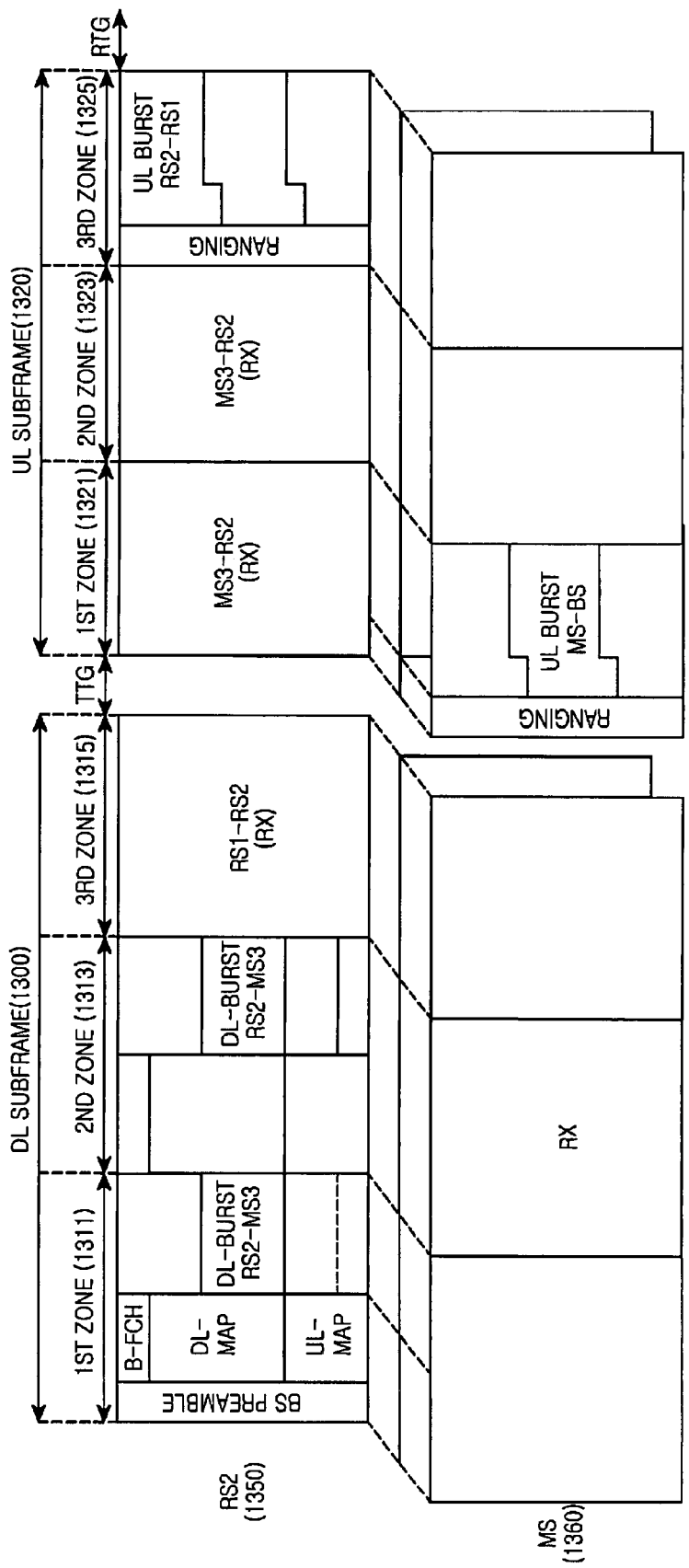
FIG. 13 illustrates a frame structure for RS2 and an MS in the 3 or more-hop relay BWA communication system according to the present invention.

In the case where the BWA communication system operates in the manner illustrated in FIG. 11 and each subframe is constructed in compliance with the IEEE 802.16 standard, frame structures for the BS and RS1 are illustrated in FIG. 12 and frame structures for RS2 and an MS are illustrated in FIG. 13.

FIG. 12 illustrates a frame structure for the BS and RS1 for the 3 or more-hop relay BWA communication system according to the present invention.

Referring to FIG. 12, the $j^{th}$ frame is divided into a DL subframe 1200 and a UL subframe 1220. The DL subframe 1200 is the configuration of into first, second and third zones 1211, 1213 and 1215, and the UL subframe 1220 is the configuration of into first, second and third zones 1221, 1223 and 1225. A TTG is interposed between the DL subframe 1200 and the UL subframe 1220.

A BS 1230 and RS1 1240 configure DL subframes to be sent to MSs within their coverage zones in the first zone 1211 of the DL subframe 1210. The DL subframes each sequentially include a preamble for synchronization, control information, and DL bursts. The preamble and the control information reside at fixed positions.

In the second zone 1213, the BS 1230 configures a DL subframe to be sent to RS1 1240. The DL subframe sequentially includes a synchronization channel for synchronization of RS1 1240, control information, and downlink bursts.

Thus, RS1 1240 receives the signal from the BS 1230 in the second zone 1213.

In the third zone 1215, the BS 1230 transitions to an idle mode or configures a DL subframe to be sent to MS1. The DL subframe includes downlink bursts only. Also in the third zone 1215, RS1 1240 configures a DL subframe to be sent to RS2, i.e. a higher RS configures a DL subframe for a lower RS. The DL subframe includes a preamble for synchronization of the lower RS, control information, and downlink bursts.

In the UL subframe 1220, the BS 1230 and RS1 1240 receive control information (e.g. ranging signal) and uplink bursts from MSs within their coverage zones in the first zone 1221.

RS1 1240 configures a UL subframe to be sent to the BS 1230 in the second zone 1223. Thus the BS 1230 receives the signal from RS1 1240.

In the third zone 1225, the BS 1230 is in the idle mode or receives a signal from MS1. Also, RS1 1240 receives a signal from RS2. That is, the higher RS receives a signal from the lower RS in the third zone 1225.

FIG. 13 illustrates a frame structure for RS2 and an MS in the 3 or more-hop relay BWA communication system according to an embodiment of the present invention.

Referring to FIG. 13, the $j^{th}$ frame is divided into a DL subframe 1300 and a UL subframe 1320. The DL subframe 1300 is divided into first, second and third zones 1311, 1313, and 1315, and the UL subframe 1320 is divided into first, second and third zones 1321, 1323, and 1325. A TTG is interposed between the DL subframe 1300 and the UL subframe 1320.

RS2 1350 configures DL subframes for MS3 within its coverage zone in the first and second zones 1311 and 1313 of the DL subframe 1310. The DL subframe created in the first zone 1311 sequentially includes a preamble for synchronization of MS3, control information, and downlink bursts. The DL subframe created in the second zone 1313 includes only downlink bursts for MS3.

RS2 1350 receives a signal from RS1 1340 in the third zone 1315.

In the DL subframe 1310, the MSs receive DL subframes from nodes that serve the MSs.

In the first and second zones 1321 and 1323 of the UL subframe 1320, RS2 1350 receives control information (e.g. ranging signal) and uplink bursts from MS3.

In the third zone 1325, RS2 1350 configures a UL subframe for RS1 1340. The UL subframe sequentially includes control information and uplink bursts.

The MSs configure UL subframes to be sent to the nodes serving the MSs in the first zone 1321. The UL subframes each sequentially include control information and uplink bursts.

The MSs configure UL subframes according to their serving nodes in the second zone 1323 and the third zone 1325. For example, MS1 communicating with the BS 1330 configures a UL subframe for the BS 1330 in the third zone 1325. MS3 communicating with RS2 1350 configures a UL subframe for RS2 1350 in the second zone 1323.

If the BWA communication system is a 3 or more-hop system and thus RS2 1350 is connected to a lower RS, RS2 1350 communicates with the lower RS instead of MS3 in the second zones 1313 and 1323.

In the above embodiment, a synchronization channel resides at the start of each of the first, second and third zones. It can be further contemplated as another embodiment that the synchronization channel is positioned at the end of each of the second and third zones.

Now a description will be made of operations of a BS and an RS for communicating using the above-described frame structure in the BWA communication system.

Figure 14:
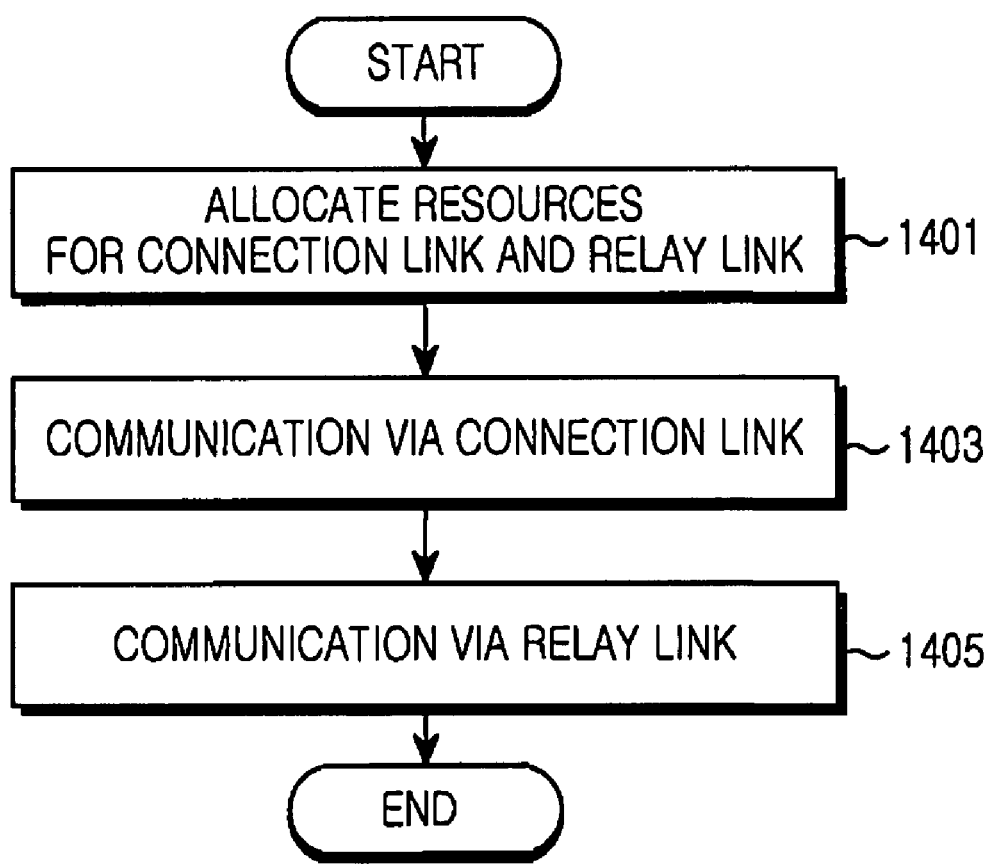
FIG. 14 is a flowchart illustrating an operation of the BS in the multi-hop relay BWA communication system according to the present invention.

FIG. 14 is a flowchart illustrating an operation of the BS in the multi-hop relay BWA communication system according to the present invention.

Referring to FIG. 14, the BS allocates resources for the connection-link subframe 701 and the relay-link subframe 703 that form a frame in step 1401. The periods of the connection-link subframe 701 and the relay-link subframe 703 are fixed or changed adaptively according to a service environment. If there is no RS within the coverage zone of the BS, the relay-link subframe 703 may not be used. In step 1403, the BS communicates with MSs in the connection-link subframe 701.

The BS also communicates with RSs in the relay-link subframe 703 in step 1405. For example, on the downlink, the BS sends control information and traffic bursts to the MSs in the connection-link subframe 701 and then sends control information and traffic bursts to the RSs in the relay-link subframe 703.

On the uplink, the BS receives initial ranging information and traffic bursts from the MSs in the connection-link subframe 701 and then receives initial ranging information and traffic bursts from the RSs in the relay-link subframe 703. Then the BS ends the algorithm.

Figure 15:
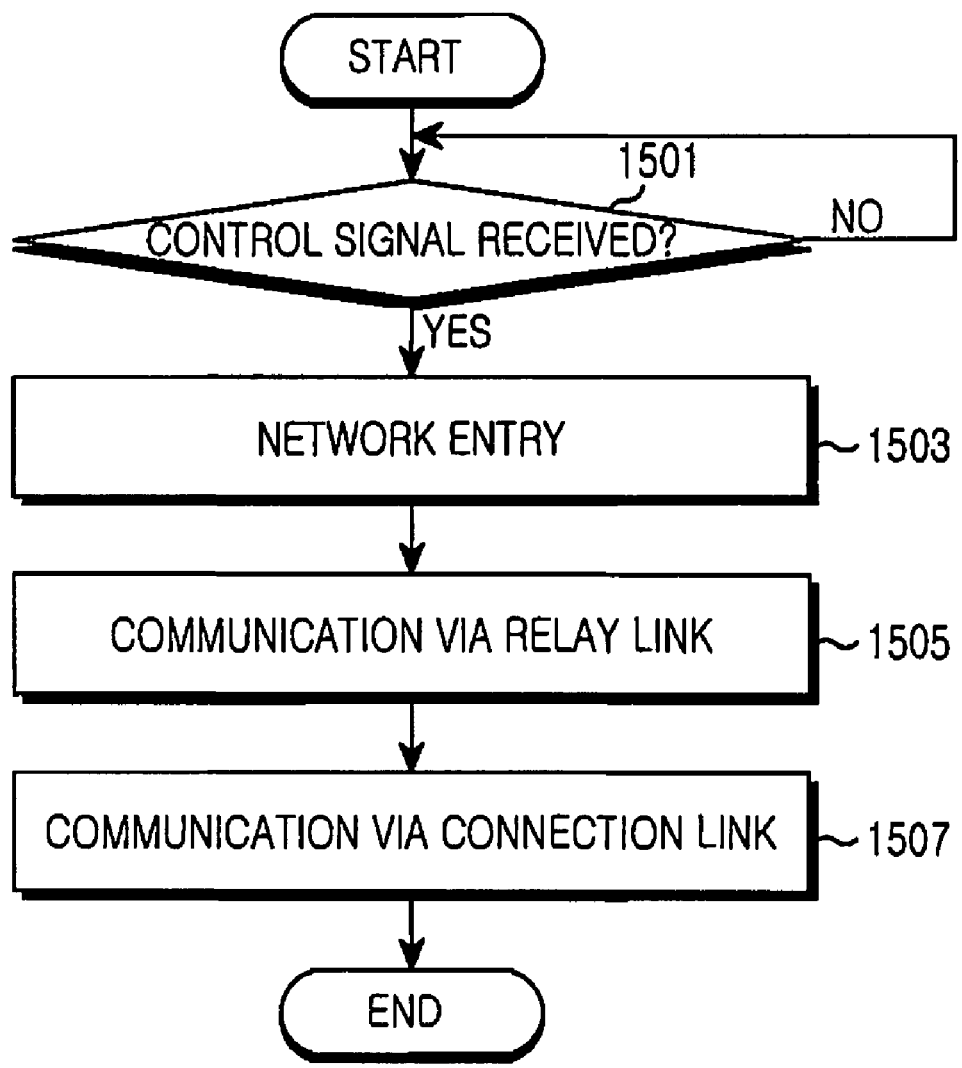
FIG. 15 is a flowchart illustrating an operation of an RS in the multi-hop relay BWA communication system according to the present invention.

FIG. 15 is a flowchart illustrating an operation of an RS in the multi-hop relay BWA communication system according to the present invention.

Referring to FIG. 15, upon power-on, the RS monitors reception of a preamble and control information from the BS in step 1501. Upon receipt of a preamble and control information, the RS performs network entry using the preamble and the control information in step 1503. In the same manner as an MS, the RS performs the network entry via a connection link rather than via a relay link. Then the RS establishes a relay link based on relay link information acquired from the initialization. Alternatively, the RS may perform the initialization via the relay link rather than via the connection link.

In steps 1505 and 1507, the RS supports a broadband service via the relay link and the connection link established according to the operational capability of the BS and the relay capability of the RS. For instance, the RS receives control information and traffic bursts for a relay service from the BS or a higher RS in the relay-link subframe 703 and then sends the control information and the traffic bursts to an MS in the connection-link subframe 701 of the next frame. If a lower RS exists under the RS, the RS can send the control information and the traffic bursts to the lower RS in the relay-link subframe 703. The RS then ends the algorithm.

While how the RS communicates with the BS has been described above, the same description holds true also for communications between the RS and its higher RS.

The BS is so configured as to have a connection-link transceiver for communicating with an MS and a relay-link transceiver for communicating with an RS. Yet, the BS can support the relay link and the connection link with use of a single transceiver.

Figure 16:
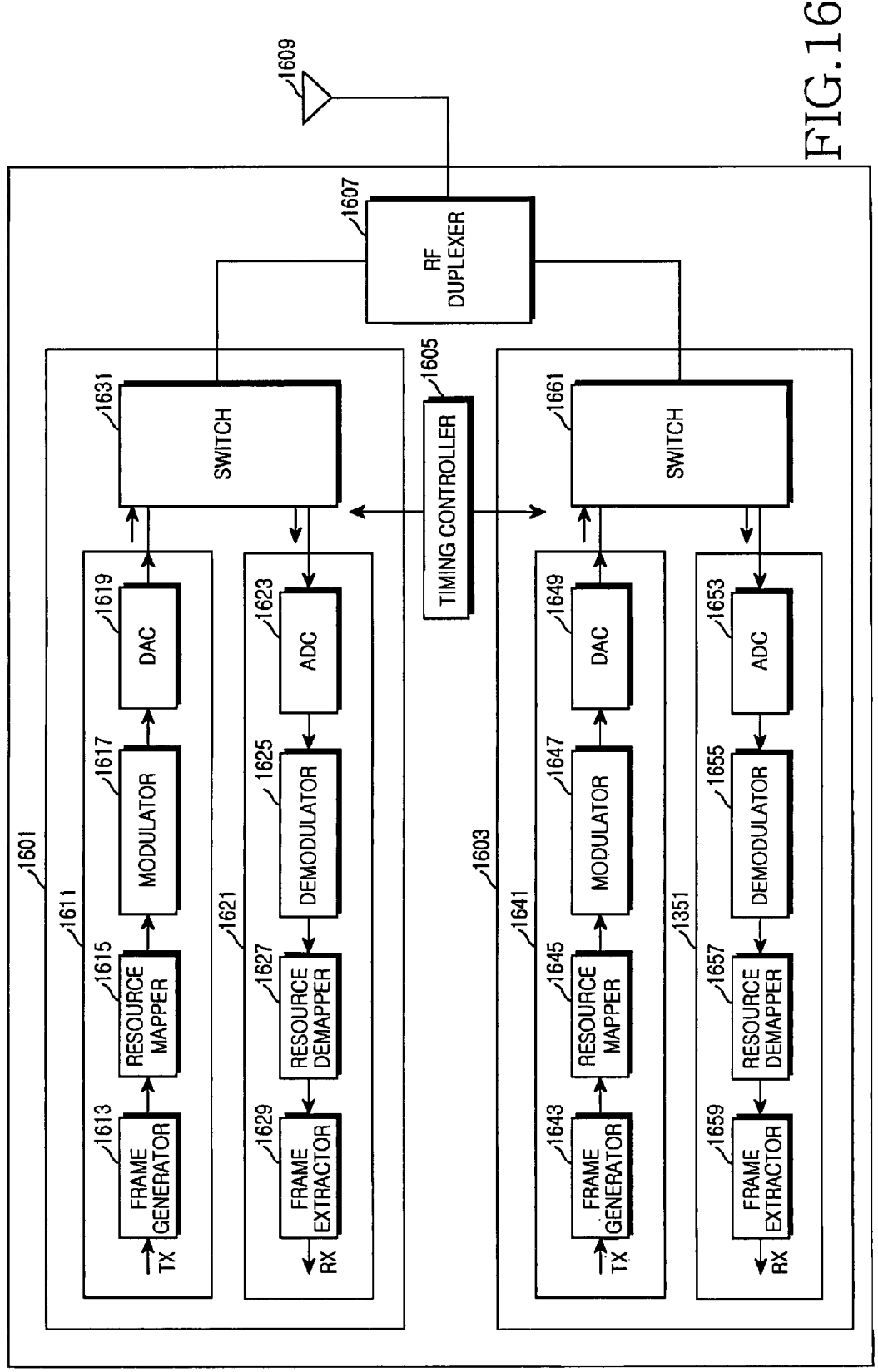
FIG. 16 is a block diagram of the BS in the multi-hop relay BWA communication system according to the present invention.

FIG. 16 is a block diagram of the BS in the multi-hop relay BWA communication system according to the present invention.

Referring to FIG. 16, the BS includes a first transceiver 1601 for a relay link, a second transceiver 1603 for a connection link, a timing controller 1605, an RF duplexer 1607, and an antenna 1609. The first transceiver 1601 and the second transceiver 1603 have the same configuration and thus only the first transceiver 1601 will be described.

The first transceiver 1601 is comprised of a transmitter 1611, a receiver 1621, and an RF switch 1631. The transmitter 1611 has a frame generator 1613, a resource mapper 1615, a modulator 1617, and a Digital-to-Analog Converter (DAC) 1619.

The frame generator 1613 configures a relay-link subframe to deliver control information and traffic bursts to an RS. A frame generator 1643 of the second transceiver 1641 configures a connection-link subframe to deliver the control information and traffic bursts to an MS.

The resource mapper 1615 maps the relay-link subframe received from the frame generator 1613 to bursts of a link allocated to the relay-link subframe. The modulator 1617 modulates the mapped subframe according to a predetermined Modulation and Coding Scheme (MCS) level. The Digital-to-Analog Converter (DAC) 1619 converts the digital signal to an analog signal, upconverts the analog signal to an RF signal, and provides the RF signal to the RF switch 1631. The receiver 1621 has an Analog-to-Digital Converter (ADC) 1623, a demodulator 1625, a resource demapper 1627, and a frame extractor 1629.

The ADC 1623 downconverts RF signals received from RSs through the RF switch 1631 in a relay-link subframe to baseband signals and converts the analog baseband signals to digital signals. The demodulator 1625 demodulates the digital signals according to a predetermined MCS level. The resource demapper 1627 extract actual subframes from the bursts of links received from the demodulator 1625. The frame extractor 1629 extracts a subframe for the receiver 1621 among the subframes received from the resource demapper 1627. For example, the frame extractor 1629 extracts relay-link subframes from UL subframes received from the RSs. A frame extractor 1659 of the second transceiver 1641 extracts relay-link subframes from UL subframes received from the MSs.

The RF switch 1631 switches one of the transmitter 1611 and the receiver 1621 to an RF duplexer 1607 under the control of a timing controller 1605.

The timing controller 1605 controls a transmission and reception timing for a relay link service period or a connection link service period.

The RF duplexer 1607 sends an RF signal received through the antenna 1609 to the transceiver 1601 or 1603 depending on a relay link service period or a connection link service period.

In accordance with the present invention as described above, a multi-hop relay BWA communication system multiplexes a connection-link zone and a relay-link zone in time division in a signal transmission period. As a result, a direct service and a relay service are transparently provided to MSs in synchronized frames. Hence, handover and synchronization are facilitated for the MSs. Also, since the relay-link zone in which an RS receives a service is configured to be independent of the connection-link zone, the freedom of configuring the relay link can be increased according to the number of hops and a channel environment.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for configuring a subframe to support a relay service in a multi-hop relay wireless communication system including at least one Mobile Station (MS), at least one Base Station (BS), and at least one Relay Station (RS), the method comprising:

configuring a BS-MS link subframe for at least one of communication between a BS and a first MS within the coverage area of the BS and an RS-MS link subframe for communication between at least one RS and a second MS within the coverage area of the at least one RS in a first zone of a downlink subframe;

if the wireless communication system includes two hops, configuring a BS-RS link subframe for communication between the BS and the at least one RS in a second zone of the downlink subframe;

if the wireless communication system includes three or more hops, configuring a BS-RS link subframe for communication between the BS and the at least one RS and an RS-RS link subframe for communication between the at least one RS and another RS in the second zone of the downlink subframe;

configuring a BS-MS link subframe for at least one of communication between the BS and the first MS within the coverage area of the BS and an RS-MS link subframe for communication between the at least one RS and the second MS within the coverage area of the at least one RS in a first zone of an uplink subframe;

if the wireless communication system includes two hops, configuring a BS-RS link subframe for communication between the BS and the at least one RS in a second zone of the uplink subframe; and if the wireless communication system includes three or more hops, configuring a BS-RS link subframe for communication between the BS and the at least one RS and an RS-RS link subframe for communication between the at least one RS and another RS in the second zone of the uplink subframe, wherein the first zone and the second zone are distinguished in the downlink subframe and uplink subframe by time resource, wherein the first zone and the second zone are located consecutively in the downlink subframe and uplink subframe, wherein a guard region is inserted between the first zone and the second zone of the downlink subframe and uplink subframe, wherein the downlink subframe and the uplink subframe are distinguished by time resources, and wherein a preamble and a MAP are positioned at a start of the first zone of the downlink subframe.

2. The method of claim 1, wherein the BS-MS link subframe is distinguished from the RS-MS link subframe by one of Frequency Division Multiple Access (FDMA), Spatial Division Multiple Access (SDMA), and Orthogonal Frequency Division Multiple Access (OFDMA).

3. The method of claim 1, wherein the BS-MS subframe and the RS-MS link subframe have the same configuration.

4. The method of claim 1, wherein the at least one RS is one of a primary RS that provides a preamble and a secondary RS that does not provide the preamble.

5. The method of claim 4, wherein if the at least one RS is the secondary RS, the RS-MS link subframe has null in areas for the preamble and MAP.

6. The method of claim 1, wherein the BS-RS link subframe and the RS-RS link subframe are multiplexed by at least one of time division and frequency division.

7. The method of claim 1, wherein the first zone and the second zone of the downlink subframe and uplink subframe have one of fixed lengths and variable lengths according to a service environment.

8. A method for configuring a subframe to support a relay service in a multi-hop relay wireless communication system including at least one Mobile Station (MS), at least one Base Station (BS), and at least one Relay Station (RS), the method comprising:

configuring a BS-MS link subframe for BS-MS communication and an RS-MS link subframe for the RS-MS communication in a first zone of a downlink subframe;

if the wireless communication system includes two hops, configuring a BS-RS link subframe for BS-RS communication in a second zone of the downlink subframe;

if the wireless communication system includes three or more hops, configuring at least one of a BS-RS link subframe for BS-RS communication, an RS-RS link subframe for RS-RS communication, and an RS-MS link subframe for RS-MS communication in the second zone of the downlink subframe;

if the wireless communication system includes two hops, configuring a BS-MS link subframe for BS-MS communication in a third zone of the downlink subframe;

if the wireless communication system includes three or more hops, configuring a BS-MS link subframe for at least one of BS-MS communication and an RS-RS link subframe for RS-RS communication in the third zone of the downlink subframe;

configuring a BS-MS link subframe for BS-MS communication and an RS-MS link subframe for the RS-MS communication in a first zone of an uplink subframe;

if the wireless communication system includes two hops, configuring a BS-RS link subframe for BS-RS communication in a second zone of the uplink subframe;

if the wireless communication system includes three or more hops, configuring at least one of a BS-RS link subframe for BS-RS communication, an RS-RS link subframe for RS-RS communication, and an RS-MS link subframe for RS-MS communication in the second zone of the uplink subframe;

if the wireless communication system includes two hops, configuring a BS-MS link subframe for BS-MS communication in a third zone of the uplink subframe;

if the wireless communication system includes three or more hops, configuring a BS-MS link subframe for at least one of BS-MS communication and an RS-RS link subframe for RS-RS communication in the third zone of the uplink subframe, wherein the first zone and the second zone and third zone are distinguished in the downlink subframe and uplink subframe by time resource, wherein the first zone and the second zone and third zone are located consecutively in the downlink subframe and uplink subframe, wherein the downlink subframe and the uplink subframe are distinguished by time resources, and wherein a preamble and a MAP are positioned at a start of the first zone of the downlink subframe.

9. The method of claim 8, wherein the BS-MS link subframe is distinguished from the RS-MS link subframe by one of Frequency Division Multiple Access (FDMA), Spatial Division Multiple Access (SDMA), and Orthogonal Frequency Division Multiple Access (OFDMA).

10. The method of claim 8, wherein the BS-MS subframe and the RS-MS link subframe have the same configuration.

11. The method of claim 8, wherein the BS-RS link subframe, the RS-RS link subframe, and the RS-MS link subframe are distinguished by at least one of time division and frequency division.

12. The method of claim 8, wherein the BS-MS link subframe is distinguished from the RS-RS link subframe by at least one of time division and frequency division.

13. The method of claim 8, wherein the first zone, the second zone, and the third zone of the downlink subframe and uplink subframe have one of fixed lengths and variable lengths according to service environment.

14. The method of claim 8, wherein a preamble channel is positioned at one of the start and end of each of the first zone and the second zone of the downlink subframe.

15. A method of a Relay Station (RS) for supporting a relay service in a multi-hop relay wireless communication system including at least one Mobile Station (MS), at least one Base Station (BS), and at least one RS, the method comprising:

performing network entry based on control information received from a higher node and acquiring subframe configuration information for supporting the relay service;

receiving a synchronization channel, control information, and a traffic burst from the higher node in a second zone of a downlink subframe in an $n^{th}$ frame;

sending a synchronization channel and the received control information and traffic burst to an MS in a first zone of a downlink subframe in an $(n+1)^{th}$ frame;

receiving a synchronization channel, control information, and a traffic burst from the higher node in a second zone of the downlink subframe in the $(n+1)^{th}$ frame; and if the wireless communication system includes three or more hops, communicating with another RS in a second zone of the downlink subframe and an uplink subframe in the $(n+1)^{th}$ frame, wherein the subframe configuration information includes information of a downlink subframe and an uplink subframe divided into a first zone and a second zone, wherein the first zone of the downlink subframe and the uplink subframe includes a BS-MS link subframe and an RS-MS link subframe, wherein, if the wireless communication system includes two hops, the second zone of downlink subframe and an uplink subframe includes a BS-RS link subframe, wherein, if the wireless communication system includes three or more hops, the second zone of downlink subframe and an uplink subframe includes a BS-RS link subframe and an RS-RS link subframe, wherein the first zone and the second zone of the downlink subframe and uplink subframe are distinguished in the downlink subframe and uplink subframe by time resources, wherein the first zone and the second zone of the downlink subframe and uplink subframe are located consecutively in the downlink subframe and uplink subframe, wherein the downlink subframe and the uplink subframe are distinguished by time resources, wherein a preamble and a MAP are positioned at a start of the first zone of the downlink subframe, and wherein a guard region is inserted between the first zone and the second zone of the downlink subframe and uplink subframe.

16. The method of claim 15, wherein the RS is one of a primary RS that provides the synchronization channel and a secondary RS that does not provide the synchronization channel.

17. The method of claim 16, wherein if the RS is the secondary RS, the RS fills null in areas for the synchronization channel and a control channel.

18. The method of claim 15, wherein the higher node is one of a BS and a higher RS.

19. The method of claim 15, wherein the network entry comprises:

receiving the control information from the higher node in a zone set for the higher node to communicate with an MS according to a predetermined subframe configuration; and performing the network entry to the higher node based on the received control information.

20. The method of claim 15, wherein the network entry comprises:

receiving the control information from the higher node in a zone set for the higher node to communicate with an RS according to a predetermined subframe configuration; and performing the network entry to the higher node based on the received control information.

* * * * *